Dec. 17, 1968  J. G. KERAMAS  3,416,987
APPARATUS FOR ALIGNING AND LABELING LIMP PACKAGES
Filed Dec. 8, 1965  2 Sheets-Sheet 1
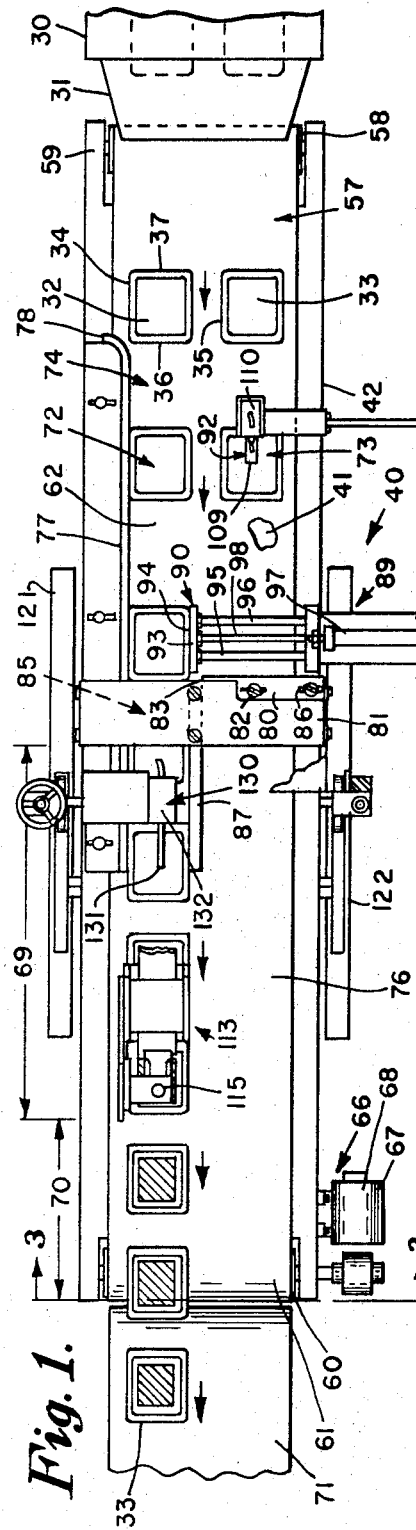
INVENTOR.
JAMES G. KERAMAS
BY
Pearson + Pearson
ATTORNEYS Dec. 17, 1968   J. G. KERAMAS   3,416,987
APPARATUS FOR ALIGNING AND LABELING LIMP PACKAGES
Filed Dec. 8, 1965   2 Sheets-Sheet 2

INVENTOR.
JAMES G. KERAMAS
BY
Pearson + Pearson
ATTORNEYS

United States Patent Office 3,416,987
Patented Dec. 17, 1968

3,416,987
APPARATUS FOR ALIGNING AND LABELING LIMP PACKAGES
James G. Keramas, 57 Kilby St.
Woburn, Mass. 01801
Filed Dec. 8, 1965, Ser. No. 512,336
10 Claims. (Cl. 156—363)

ABSTRACT OF THE DISCLOSURE

This invention relates to an improved untimed aligner apparatus especially for use with a two-lane packaging machine to divert packages into a single lane for the action of a single labeling machine.

---

It has heretofore been proposed to divert plural lanes of cylindrical articles, such as milk bottles, into a single lane by rolling article contact, as in U.S. Patent No. 2,753,975 to Day, of July 10, 1956.

However, the diversion of articles of rectangular, or polygonal configuration from plural lanes into a single lane cannot depend on rolling article contact for properly spacing the articles, for avoiding jamming up of the articles, or for avoiding twist of the articles.

In U.S. Patent No. 2,560,995 to Stiles, of July 17, 1951, an obliqued moving belt guides the polygonal articles from one lane over to another lane and a friction wheel is used to remove jams by moving some of the articles rearwardly. In U.S. Patents No. 2,907,443 to Del Rosso, of Oct. 6, 1959, and No. 3,144,119 to Nigrelli, of Aug. 11, 1964, a rotatable wheel or a movable pin is provided in each lane to temporarily stop the articles in each lane to avoid jamming. Such devices require a relatively rigid package against which the movable guides or stops may act and also halt the packages in both lanes while the conveyor moves thereunder.

The apparatus of this invention, however, is for the purpose of handling relatively limp, nonrigid, flat packages, for example, slices of meat, vacuum packed in heat sealed plastic envelopes, such packages becoming distorted and difficult to label, if conveyed as taught in the prior art.

This invention makes use of a reciprocable plunger means for moving the packages in one lane transversely across a conveyor belt into the space between packages in the other lane, such plunger means being disclosed in U.S. Patent No. 3,040,861, to Bilocq, of June 26, 1962, and in U.S. Patent No. 3,107,788, to Thiele, of Oct. 22, 1963. However, because of the limpness of the packages, in this invention the packages to be translated are sensed well in advance of a fixed barrier normal to the path of the packages, the conveyor surface is rough, to avoid overtravel, rebound or twist, and the plunger means is quick acting, to push each successive package so sensed sidewise along the fixed barrier to its exact position of alignment in the other lane. The fixed barrier, or leading edge guide, normal to the path of the packages, the rough surface of the conveyor, and the package sensing well in advance of the barrier and plunger have been found to be critical in successfully handling limp packages without undue permanent marking or distortion.

The principal object of the invention is therefore to provide a rugged, low cost untimed, aligner apparatus capable of diverting two lanes of limp packages into a single lane in undamaged condition suitable for the adherence of labels thereon by a single labeling machine.

Figure 3:
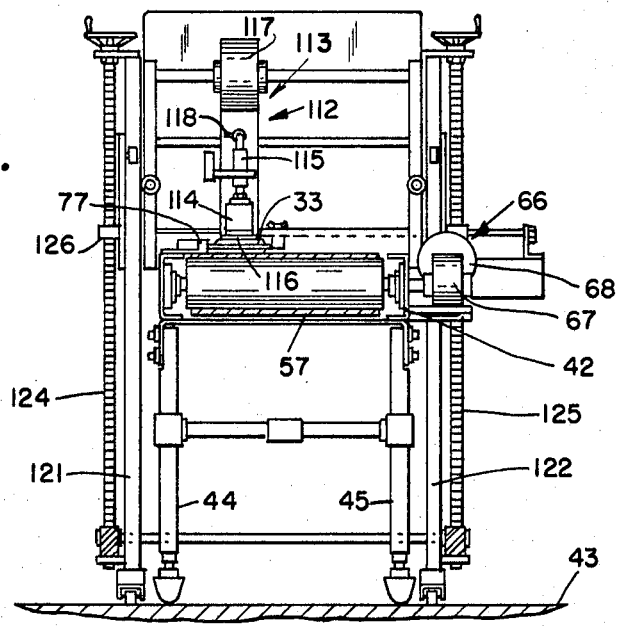
Figure 4:
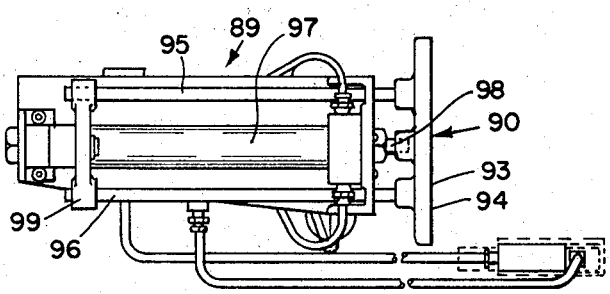
Figures 5, 6:
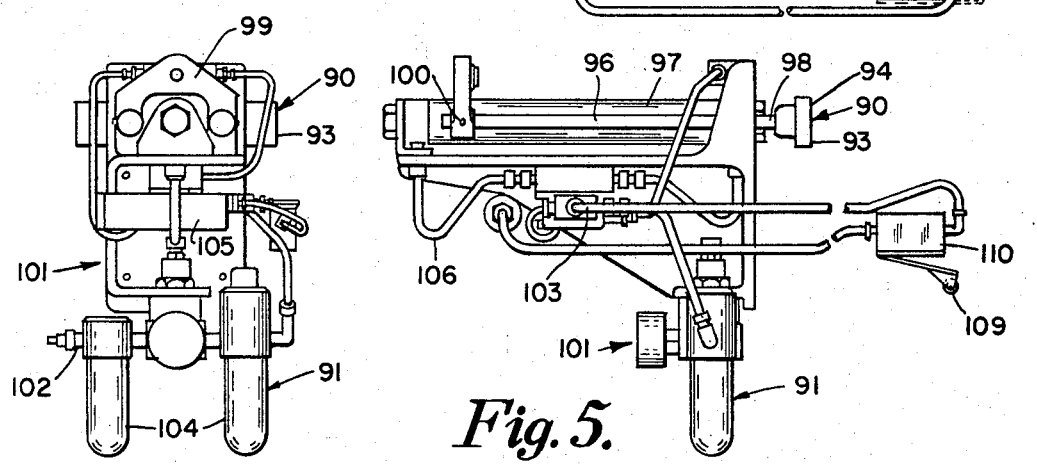

Other objects of the invention will be apparent from the claims, the description of the drawings, and from the drawings, in which:

FIGURE 1 is a plan view of the untimed aligner apparatus of the invention;
FIGURE 2 is a side elevation thereof;
FIGURE 3 is an end elevation thereof, in section on line 3—3 of FIGURE 1;
FIGURE 4 is an enlarged, fragmentary plan view of the air operated plunger means and package sensing means of the invention;
FIGURE 5 is a side elevation thereof; and
FIGURE 6 is a rear elevation thereof.

As shown in FIGURES 1 and 2, 30 represents a typical skin packaging machine, well known in the art, of the vacuum type which wraps and heat-seals plastic sheets tightly over foodstuffs, such as slices of cheese, meat, or the like. The machine 30 includes a discharge exit 31 and a suitable conveyor for continuously delivering laterally aligned pairs of flat, generally rectangular, or polygonal, limp packages 32 and 33 at a predetermined delivery, or discharge, speed. The packages 32 and 33 are substantially identical and usually laterally spaced apart as illustrated, each package having side edges 34 and 35, a leading edge 36, and a trailing edge 37. At least three edges are formed by the heat-sealed seam of the wrapper and present a limp, nonrigid exterior, while the wrapped foodstuff also is limp and easily distortable.

UNTIMED ALIGNER APPARATUS

The untimed aligner apparatus 40 of the invention includes an elongated table 41, having a frame 42 and supported above the floor 43 by legs such as 44 and 45. To adjust for packaging machine exits of various heights above floor level, the legs 44 and 45 include the lower portions 46 and 47, in which upper portions 48 and 49 are telescopable and vertically adjustable as by lock pins 50. To permit the legs 44 and 45 to remain vertical while the frame 42 and table 41 are inclined from the horizontal, a bracket 51 depends from frame 42, proximate each end thereof, the bracket being pivotally connected by pivot 52 to the upper portion 48 of the leg, and having an arcuate slot 53 for a set screw 54 to lock the table at the desired angle of inclination.

A single relatively wide endless conveyor belt 57 is trained around a roll 58 at one end 59 of frame 42, around a roll 60 at the other end 61 of frame 42 with the upper stretch 62 supported on table 41, and the lower stretch 63 supported on roll 64 to prevent undue sag, all of the rolls being suitably journaled in bearings in a well known manner. Drive means 66 in the form of an electric motor driven reducer 67 is mounted at the end 61 of frame 42 to drive the belt roll 60 at a predetermined speed, the drive means 66 including a variable speed control 68 for selectively changing such speed. The upper stretch 62 of belt 57 thus advances unidirectionally at predetermined speed longitudinally along table 41 from exit 31 of machine 30 through a labeling zone 69 to a package discharge zone 70, to deliver labeled packages to a rotary turntable, discharge apron, or other machine 71.

The successive pairs of packages 32 and 33 each have a predetermined length and are discharged by machine 30 at a predetermined speed from exit 31 onto the end of belt 57, with successive pairs in abutting contact. Drive means 66 advances the upper stretch 62 preferably at a surface speed at least one and one-half times faster than the speed of delivery, so that the successive pairs of packages are longitudinally spaced apart a distance equal to about one and one-half times the length of a package. The packages thus advance in two parallel lanes, or rows, 72 and 73, along straight longitudinal paths, with the packages in the first lane or row, such as 72, having spaces 74 therebetween of sufficient longitudinal dimension to accommodate a package from the adjacent parallel second lane, or row 73.

The surface 76 of the belt 57 is a friction surface with a rough finish. By "rough friction surface" is meant the surface of a material such as rubber which has been molded, cut, embossed or abraded so as to produce upstanding projections at least one-sixteenth of an inch in height.

A straight, upstanding side edge guide 77 is fixed to frame 42 and extends alongside the path of the outer side edges 34 of the packages in one lane, such as 72, for assuring that these packages travel in rectilinear longitudinal alignment along a path through labeling zone 69 without twist. The forward end 78 of guide 77 is outwardly flared to intercept any misaligned packages and guide the same back into alignment.

A leading edge barrier, or stop, 80 is fixed to a frame piece 81 by suitable bolts 82 and extends transversely across the path of packages in lane 73 in a direction normal to the path and to the side edge guide 77. The barrier 80 is smooth, and continuous, so that a package such as 33 having its leading edge 36 in engagement therewith, may be slid sidewise into lane 72 while supported against twisting. The terminal end 83 of the smooth depending guide portion 84 of barrier 80 is at about the longitudinal centre line of the belt 57 to define with the side guide 77 a package passage 85, capable of passing the single lane of packages 72. Slots 86 in barrier 80 permit it to be moved transversely to reduce the width of passage 85 if desired. A longitudinally extending side guide 87 is preferably integral with the terminal end of barrier 80 and in parallelism with side guide 77 to assure that all packages are untwisted in the labeling zone 69.

Package actuated translation mechanism 89 is provided, including reciprocable plunger means 90, actuating means 91, and package actuated sensing means 92. Plunger means 90 includes a package aligning paddle, or head, 93, having a face 94 parallel to side guide 77 and normally poised in retracted position alongside the path of the packages 33 in lane 73 just in advance of the barrier 80. Paddle 93 is fixed to the ends of a pair of parallel guide rods 95 and 96 slidable in the cylinder housing 97 and is fixed to the end of the centrally located fluid actuated piston rod 98. A yoke 99 connects the opposite ends of rods 95 and 96. The paddle 93 is movable in a direction normal to the path of the packages from its retracted position through a stroke extending to the inner side edges 34 of the packages 32 in lane 72. The yoke 99 is slidably adjustable on rods 95 and 96 by set screws 100 to adjust the length of the stroke as desired. Preferably the plunger means 90 is air operated, the actuating means 101 therefor including an inlet 102 from a suitable source of compressed air, not shown, such as a mill air pressure line, and a suitable air circuit 103, including conventional reducing valves 104, operating valves 105 and air conduits 106.

The packages actuated sensing means 92 is mounted substantially in advance of the barrier 80, and plunger means 90, in the path of each successive package in lane 73. Means 92 includes a package engaging arm 109, preferably of looped, flexible metal, the arm 109 being arranged to actuate an air control valve 110, in the air circuit 103, to energize the actuating means 101 of translation mechanism 89.

Thus as each successive package 33 in lane 73 engages arm 109, it raises the arm to open the valve 110 and thereby causes the paddle 93 to quickly slide the preceding package, resting against barrier 80, laterally along the barrier over into a space 74 in lane 72, and to rapidly return to its normal position before the arrival of the next package at the barrier 80. The leading edges and the side edges of each package so moved, are registered at all times against the straight, right angular faces of paddle 93, barrier 80, or side guides 77 and 87, thereby assuring no twist of the package.

PACKAGE LABELING MECHANISM

The package labeling mechanism 112 includes a labeler 113 of well known type, the particular device illustrated being an "Amscomatic 300" labeler commercially available from Amsco Packaging Machinery, Inc., of Long Island, N.Y. Labeler 113 is provided with spring leaf fingers 114 actuated by an air piston 115 to yieldably press successive individual labels 116, fed from a roll supply 117, down onto the upper face of each package 32 or 33 advanced thereunder in lane 72 by belt 57 in labeling zone 69. The labeler 113 is electrically actuated by an electric circuit 118, including a suitable source of current, not shown to feed each label 116 with adhesive on the index face thereof, from the tip of a shelf-like conveyor 119 so that the leading portion of the adhesive label is engaged by the leading portion of the package and progressively adhered thereon by the spring fingers 114.

In this invention the labeler 113 is mounted in straddle position above table 41 to align the label applying fingers 114 with the path of the packages in lane 72, thus permitting a single labeler to label all packages discharged in plural lanes by the packaging machine 30. As shown, labeler 113 is supported by a pair of laterally spaced supports 121 and 122, each on an opposite side of table 41, and unconnected thereto, the supports 121 and 122 having a common base 123 at the level of floor 43. The labeler 113 is vertically adjustable on supports 121 and 122 by means of the threaded shafts 124 and 125 which threadedly engage the frame bracket 126 of the labeler, so that the labeler may be moved vertically to any desired height corresponding to the height of the belt 57.

A second package sensing means 130 is provided in labeling zone 69, means 130 including a flexible spring arm 131, normally depending at an angle in the path of each successive package 32 or 33 advancing along lane 72 after passing through passage 85. Arm 131 closes a normally open electric switch 132 in electric circuit 118 to energize labeler 113 and cause the labeler to feed and apply a label onto each package passing under the fingers 114. Package detection thus occurs in advance of the labeling station just as package detection in lane 73 occurs in advance of the package translation station.

What is claimed is:

1. Apparatus for forming a single straight row of spaced, rectangular, limp packages from a first row and an adjacent parallel second row of said packages delivered by a treatment machine, without twisting or permanently distorting said packages, said apparatus comprising
an elongated table having a single conveyor belt extending longitudinally therealong, said belt being adapted to successively receive individual packages from said machine and advance the same in said first and second rows with said packages in spaced, laterally aligned pairs;
drive means on said apparatus, synchronized with said machine, for advancing said belt at a predetermined speed to longitudinally space each said pair from the next succeeding pair a distance at least one and one-half times the length of a package;
a straight upstanding, side edge guide, extending longitudinally along the path of the outer edges of the packages in said first row for preventing twist of the packages in said row;
a leading edge barrier on said table fixed in the path of the leading edges of the packages in said second row, said barrier being normal to said guide and defining a passage therewith for the packages in said first row;
reciprocable plunger means mounted in advance of said barrier, for pushing each successive package in said second row, laterally across said belt into the space between the packages in said first row;
actuating means for reciprocating said plunger means;
package actuated sensing means on said table mounted substantially in advance of said plunger means in the path of the packages in said second row for individually and successively detecting each package therein and energizing said actuating means; and a rough friction surface on said conveyor belt for resisting the lateral movement of each package moved laterally by said plunger means to halt said package exactly at the end of the plunger stroke and to prevent rebound from said side edge guide.

2. Apparatus as specified in claim 1, wherein
said reciprocable plunger means includes an air cylinder and a piston slidable therein;
said actuating means includes a source of compressed air and an air circuit including said cylinder; and
said sensing means includes an air valve in said circuit and a package engaging arm for controlling said valve.

3. Apparatus as specified in claim 1, wherein
said table includes a set of four lower legs, each having an upper leg vertically telescopable and adjustable therein, and
each upper leg is pivotally connected proximate the adjacent corner of said table,
whereby said conveyor and table may be inclined from the horizontal while said legs remain vertical relative to a floor.

4. Apparatus as specified in claim 1, plus
package-actuated labeling mechanism mounted above said conveyor belt in rear of said passage and operable on the packages in said first row to apply labels thereto;
a second package-actuated, sensing means on said table, mounted in rear of said passage and in advance of said labeling mechanism, in the path of the packages in said first row, for individually and successively detecting the packages therein; and
electric circuit means including said labeling mechanism, said sensing means and a source of current;
whereby said second package-actuated sensing means automatically actuates said labeling mechanism.

5. In combination
a packaging machine delivering a plurality of packages of generally flat, polygonal configuration in spaced, laterally aligned, pairs at a predetermined speed,
untimed aligner apparatus associated with said machine, said apparatus including:
an endless belt conveyor receiving said pairs of packages in a first lane and an adjacent parallel second lane and transporting the same along a longitudinal path through a labeling zone to a discharge zone;
drive means for said conveyor, advancing the same at a predetermined speed greater than the speed of discharge of said packaging machine, to separate successive pairs of packages by a longitudinally extending space substantially longer than the length of one of said packages;
a rough, friction surface on said conveyor for resisting sliding movement of said packages thereover;
package-actuated labeling mechanism in said labeling zone, mounted above the path of said first lane of said packages advancing on said conveyor, for adhering a label to each successive package passing thereunder;
a package barrier fixed on said apparatus, extending across, and normal to, the path of the packages in the second said lane, in advance of said labeling zone, for halting each successive package in said second lane; and
package-actuated translation mechanism mounted alongside said conveyor in advance of said fixed barrier, said mechanism including an air-operated plunger movable in a direction normal to the path of said packages to push each successive package halted by said barrier along said barrier and into the space between the packages advancing in said first lane of packages to form a single lane thereof.

6. A combination as specified in claim 5 wherein
said aligner apparatus includes a straight, upstanding side edge guide extending longitudinally along the side edges of the packages in said first lane from said package-actuated translation mechanism through said labeling zone for maintaining rectilinear alignment of said packages,
said guide having an outwardly flared forward end in the path of any misaligned packages in said first lane for guiding said packages into longitudinal alignment on said conveyor.

7. A combination as specified in claim 5 wherein
said package-actuated labeling mechanism includes a pair of laterally spaced, vertically adjustable supports, each on an opposite side of said aligner apparatus for supporting said labeling mechanism in straddle position thereover.

8. A combination as specified in claim 5, wherein
said aligner apparatus includes vertically adjustable legs, pivotally connected to said apparatus at the upper ends thereof, and
said labeling mechanism includes a pair of vertically adjustable supports, each on an opposite side of said aligner apparatus, for supporting said labeling mechanism in straddle position relative to said aligner apparatus,
whereby said aligner apparatus may be inclined from the horizontal to conform to the height of said packaging machine and said labeling mechanism may be correspondingly adjusted in a vertical direction to apply labels to the packages on said conveyor.

9. A combination as specified in claim 5, wherein
said conveyor drive means includes a variable speed control whereby said conveyor may be driven at a selected surface speed substantially greater than the surface speed of abutting packages discharged by said packaging machine to thereby form a space between said pairs of packages at least equal in length to one and one-half times the length of each package.

10. A combination as specified in claim 5 wherein
said package-actuated translation mechanism includes a package sensing means mounted substantially in advance of said fixed barrier and substantially in advance of said plunger, in the path of said packages in said second lane for individually and successively detecting each package therein, said means including an air valve for controlling the movement of said air-operated plunger.

References Cited

UNITED STATES PATENTS

| | | | |
|---|---|---|---|
| 3,224,550 | 12/1965 | Nigrelli et al. | 198—32 |
| 3,238,080 | 3/1966 | Schluter | 156—363 |
| 3,244,267 | 5/1966 | Berta | 198—32 |

EARL M. BERGERT, *Primary Examiner.*

W. E. HOAG, *Assistant Examiner.*

U.S. Cl. X.R.

156—566; 198—32